United States Patent [19]

Willyoung

[11] 4,253,300
[45] Mar. 3, 1981

[54] SUPPLEMENTARY FIRED COMBINED CYCLE POWER PLANTS

[75] Inventor: David M. Willyoung, Scotia, N.Y.

[73] Assignee: General Electric Company, Schenectady, N.Y.

[21] Appl. No.: 63,390

[22] Filed: Aug. 3, 1979

[51] Int. Cl.³ .............................................. F02C 6/18
[52] U.S. Cl. .......................... 60/39.18 B; 60/39.46 S
[58] Field of Search ................. 60/39.18 R, 39.18 B, 60/39.46 S, 39.46 P, 650, 682, 683; 122/4 D; 431/7, 170

[56] References Cited

U.S. PATENT DOCUMENTS

| | | | |
|---|---|---|---|
| 2,471,755 | 5/1949 | Karrer | 60/655 |
| 3,127,744 | 4/1964 | Nettel | 60/655 |
| 3,247,129 | 4/1966 | Roelofsen et al. | 60/39.18 B |
| 3,791,137 | 2/1974 | Jobb et al. | 60/39.18 R |
| 3,871,172 | 3/1975 | Fisher et al. | 60/39.02 |
| 4,086,758 | 5/1978 | Harboe | 60/39.46 S |
| 4,116,005 | 9/1978 | Willyoung | 60/655 |
| 4,164,124 | 8/1979 | Taylor et al. | 60/683 |

OTHER PUBLICATIONS

*Fluid-Bed Technology Advances,* Electric World, Dec. 15, 1976, pp. 39–41.
NASA-CR 134949, p. 14, (NASA Publication).

*Primary Examiner*—Louis J. Casaregola
*Attorney, Agent, or Firm*—Ormand R. Austin; John F. Ahern

[57] ABSTRACT

The present invention provides an improvement in the art of combined steam turbine and gas turbine power plants of the type wherein the principal source of energy is a fluidized bed combustor fueled by coal. More specifically, the invention pertains to supplemental firing of the gas turbine cycle with a clean hydrocarbon fuel (CHF) at a high incremental efficiency to significantly increase overall plant efficiency.

12 Claims, 2 Drawing Figures

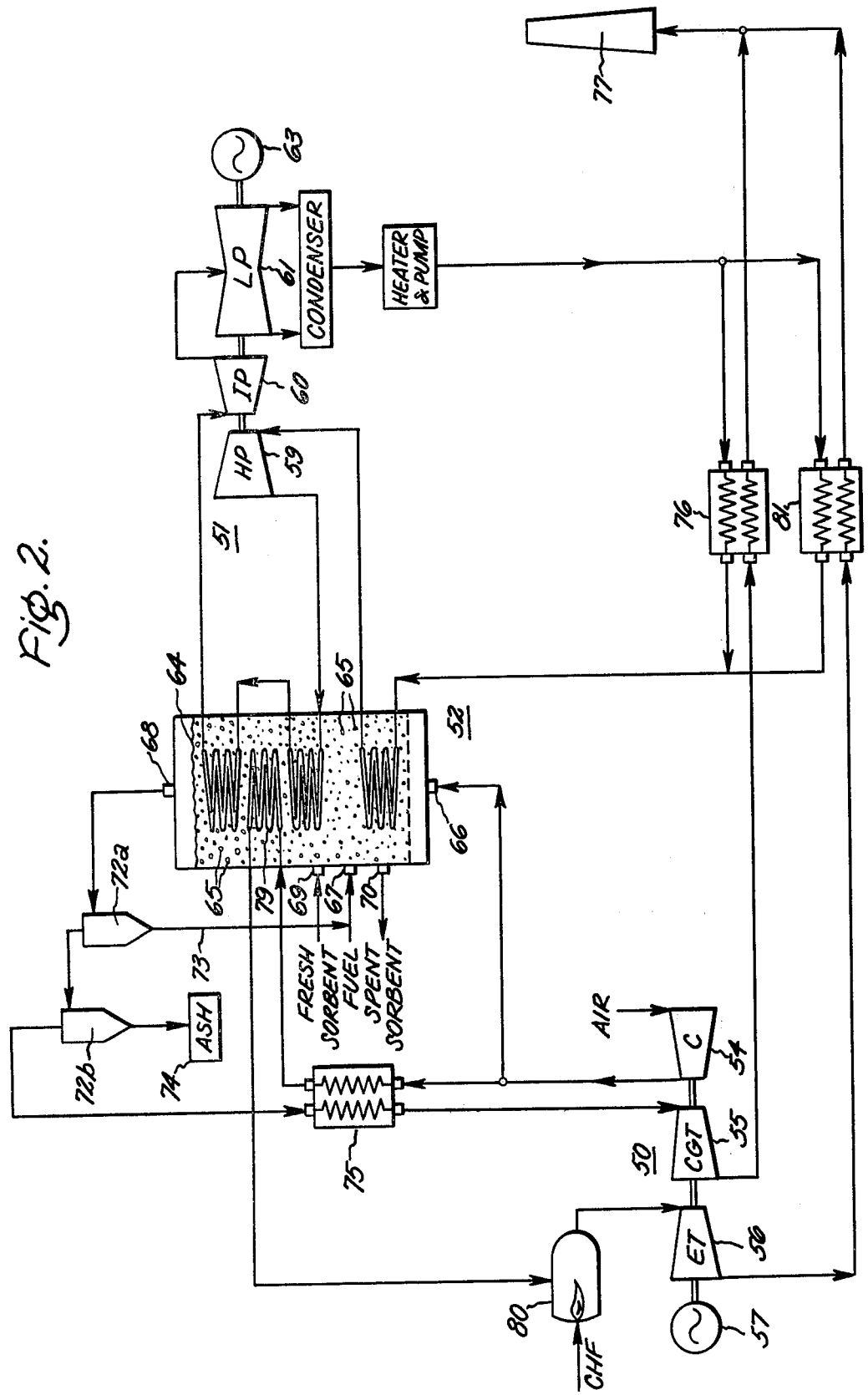

SUPPLEMENTARY FIRED COMBINED CYCLE POWER PLANTS

BACKGROUND OF THE INVENTION

The basic concept of thermodynamically coupling a Rankine-cycle steam turbine and a Brayton-cycle gas turbine to achieve overall efficiency higher than would be obtainable for either cycle alone (working in the same range of fluid temperatures and pressures) is well known. The higher efficiency achieved by combining cycles reduces fuel requirements and costs, and conserves energy that otherwise would be rejected to the environment as heat. The quantity and type of undesirable effluents in the plant exhaust gases can also be limited if a combined cycle plant is restricted to burning natural gas or refined or specially treated petroleum oils. Unfortunately, at the present time, these clean burning fuels are relatively scarce as compared to carbonaceous solid fuels such as coal, and alternative means have been sought to make coal, regardless of its rank or quality, an acceptable fuel for combined cycle power plants.

An important development in the field of power generation technology has been the use of coal-fueled sulfur-sorbing fluidized bed combustors to provide the basic energy source while minimizing power plant emissions. Although burning coal, it has been found that environmentally safe, sulfur-sorbing fluidized bed combustors can be utilized in combined cycle power plants to provide a gas turbine motive fluid that is free from undue corrosion and fouling effects which otherwise would cause severe reliability problems. Such uses are disclosed in U.S. Pat. No. 4,116,005 to Willyoung, and in the allowed U.S. patent application of Willyoung filed concurrently herewith under application Ser. No. 063,469 and assigned to the assignee of the present invention.

With these coal burning combined cycle plants, however, limitations of the sulfur-sorbing fluidized bed combustor have constrained the gas turbine to operate at less than state-of-the-art inlet temperatures, resulting in the gas turbine making less than optimal contribution to overall plant efficiency. Present-day gas turbines are able to operate at firing temperatures much higher than can now be obtained with a fluidized bed heater. The temperature discrepancy (which ma be as much as 450° F. for current commercial gas turbines and 800° F. or more for gas turbine designs projected for the future) is caused by two operational limitations on the fluidized bed combustor. First, because coal contains significant levels of sulfur, the bed temperature must be limited to a range which will insure sufficient sulfur capture by reaction with the in-bed sorption material to satisfy air emission standards. The second constraint that acts to limit fluidized bed combustor temperatures arises from the limitations and capabilities of presently available metallic materials which are suitable for in-bed heat transfer surfaces or for meeting structural requirements.

It is one object of the present invention, therefore, to provide an improved combined cycle power plant having a coal-fueled fluidized bed combustor as its principal source of energy and wherein the gas turbine is operated at state-of-the-art levels of specific power and firing temperature so that the highest overall power plant efficiency is attained.

Another object of the invention is to significantly increase the overall efficiency of a combined cycle steam turbine and gas turbine power plant without using a large proportion of premium fuel such as natural gas or petroleum.

Yet another object of the invention is to provide a highly efficient combined cycle power plant including a reliable gas turbine not exposed to coal combustion products.

SUMMARY OF THE INVENTION

These and other objects of the invention are attained by providing a clean hydrocarbon fuel (CHF) combustor to supplement the gas turbine portion of the system so that the temperature of the working fluid driving the gas turbine is increased. The gas turbine working fluid thus contains the CHF combustion products, but since CHF meets normal gas turbine fuel specifications, sulfidation, hot corrosion, and erosion rates are not excessive. The CHF, which may be oil or other clean hydrocarbon fuel, contributes less than 10 percent of the total fuel energy (based on present state-of-the-art gas turbine inlet temperatures), but introduced to generate topping heat, provides incremental efficiency well in excess of 50 percent. That is, the CHF is used at a rate which is higher than would be attainable were such fuel to comprise the total fuel supply. Overall plant efficiency is increased by approximately 10 percent relative to a fluidized bed combined cycle plant without supplemental firing. The invention is advantageously applied with either atmospheric pressure fluidized bed combustors or with pressurized fluidized bed combustors in which the combustion gas is cleaned, cooled somewhat, and used to drive a second gas turbine.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 2 shows a combined cycle steam turbine and gas turbine power plant having a pressurized fluidized bed combustor and including a CHF combustor to add supplemental heat energy to the gas turbine cycle.

DETAILED DESCRIPTION OF THE INVENTION

Figure 1:
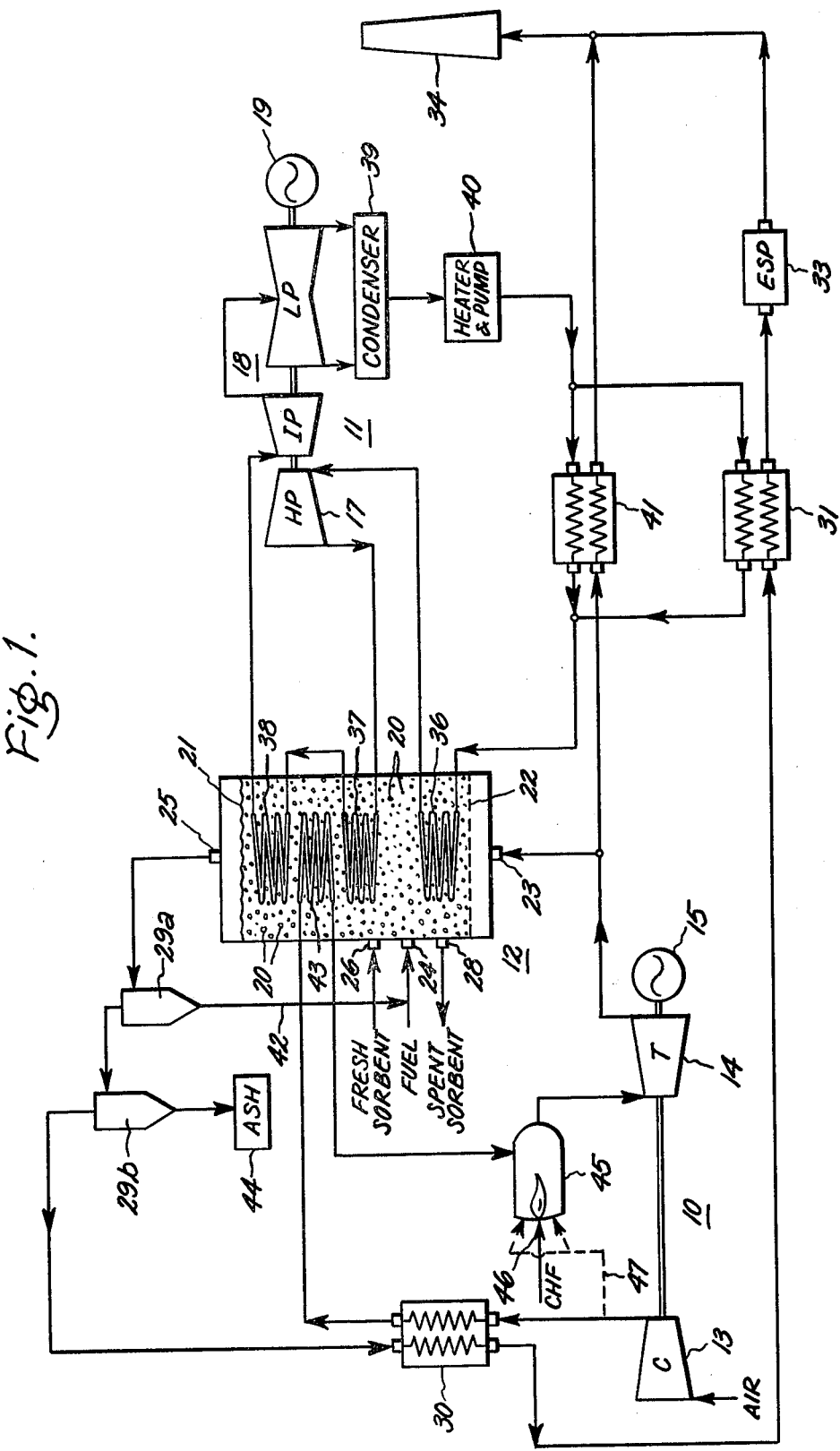
FIG. 1 shows a combined cycle steam turbine and gas turbine power plant having an atmospheric pressure fluidized bed combustor wherein air, preheated by heat derived from the fluidized bed, has supplemental heat added by a CHF combustor to provide a higher temperature motive fluid for the gas turbine.

In a preferred embodiment of the combined cycle power plant as shown in FIG. 1, a gas turbine unit 10 is combined with a steam turbine 11, with heat energy for driving both turbines furnished in whole or in part by atmospheric pressure fluidized bed combustor 12. Gas turbine unit 10, comprising a compressor section 13 and a turbine section 14, is connected in driving relationship to load 15 which may be a dynamoelectric machine. The steam turbine 11, comprising a high-pressure section 17 and lower pressure sections generally designated 18, is connected in a driving relationship to a second load 19 which may also be a dynamoelectric machine.

The fluidized bed combustor 12 is of the type disclosed in U.S. Pat. No. 4,116,005 (which disclosure is incorporated herein by reference thereto) and includes a plurality of sulfur-sorbing particles 20 forming a fluidized bed 21 which is suspended above a grate 22 by a stream of gas which passes therethrough. The sulfur-sorbing particles 20 are preferably calcined limestone (calcium carbonate) or dolomite (calcium magnesium carbonate) typically 1/16 to ½ inch in maximum dimension. The particles 20 capture sulfur oxides during combustion of coal or other carbonaceous fuel and also promote heat transfer. The fluidized bed combustor 12 includes a first inlet 23 for receiving a gas stream containing air to fluidize the bed 21 and support combustion, a second inlet 24 for receiving coal or other carbonaceous fuel, and an outlet 25 for discharge of combustion gases and other exhaust products including particulate matter. Fresh sulfur-sorbing particles 20 are supplied to the fluidized bed combustor 12 through a third inlet 26, and spent-sorbing particles and ash solids are removed through exit port 28. The percentage of coal in the bed 21 is typically rather small—of the order of one percent or less by weight, and as supplied to the bed 21, the coal is preferably in the form of solid particles.

Exhaust and combustion gases from the fluidized bed combustor 12 pass through particulate separation equipment 29a and 29b which may be multiple stage cyclone-type devices, through one side of heat exchanger 30, through feedwater heat-exchanger 31 and a final clean-up device 33 to pass to stack 34 from which the cleansed gases pass to the atmosphere. Solid matter which contains a significant amount of unburned carbon is separated from the gas stream by separator 29a and is recycled to the fluidized bed. This material may, for example, be fed back in with fresh fuel, as indicated by line 42. Solid material separated in the secondary separation stage 29b, typically contains little unburned carbon and is sent to ash disposal bin 44.

Fuel burned in fluidized bed combustor 12 provides the principal source of heat energy for sustaining plant operation. A portion of the fluidized bed heat energy is transferred by steam generating heat exchangers 36, 37, and 38, located within the combustor 12, to furnish throttle and reheat steam for turbine 11 which is arranged for high efficiency steam extraction for feedwater heating in the conventional manner (indicated schematically by feedwater heater system 40). In the steam turbine cycle, condensate from condenser 39 is heated in feedwater heater system 40, passed through parallel heat exchangers 31 and 41 for additional heat value prior to passing to the inbed heat exchanger 36 wherein steam is generated for high-pressure turbine section 17. Steam exhausted from high-pressure turbine 17 is reheated in heat exchangers 37 and 38.

For the gas turbine cycle, air taken in and pressurized by compressor 13 is preheated in heat exchanger 30 by heat extracted from the combustion gas stream exhausted by the fluidized bed combustor 12. The preheated air then passes through in-bed heat exchanger 43 to gain additional heat energy, raising the temperature of the air to nearly that of the bed. The bed temperature is limited, however, by the availability of high-temperature alloys from which the in-bed heat exchanger 43 may be constructed. Presently available economic alloys do not provide the required corrosion resistance and mechanical strength for temperatures above about 1550° F.

A further limitation on bed temperature (and hence in the temperature of the air passing from heat exchanger 43) results from the need to maintain the most effective temperature for removal of sulfur compounds by the sorption particles. When introduced into the combustor 12 the particles are typically crushed limestone (calcium carbonate) or dolomite (calcium magnesium carbonate), the latter undergoing chemical transformations analogous to those described herein for limestone. After entry into the combustor 12, the limestone particles are calcined by combustor heat, giving off carbon dioxide to form chemically active calcium oxide. The calcium oxide is highly reactive with the oxides of sulfur produced during combustion of the sulfur-bearing fuel, but only over a limited temperature range; the upper limit of which is around 1650° for combustion at atmospheric pressure.

To provide gas turbine 14 with motive fluid at a temperature high enough to take advantage of its state-of-the art capabilities and thus increase cycle efficiency, a clean hydrocarbon fuel (CHF) combustor 45 adds supplemental heat energy to the gas turbine cycle. The CHF (e.g., natural gas or petroleum oil), comprising approximately ten percent of the total plant fuel or less (depending on the compressor discharge temperature, the temperature rises in heat exchangers 30 and 43, and the inlet temperature of turbine 14), is fed into the combustor 45 at inlet 46 and is burned with the preheated air stream from heat exchanger 43. There is thus provided a high-temperature working fluid for the gas turbine 14 which approaches state-of-the-art capability (1800°–2100° F.). Although the working fluid contains CHF combustion products, turbine sulfidation, hot corrosion and erosion will not be excessive since the CHF meets normal gas turbine fuel specifications. Relative to a gas turbine fueled entirely with CHF of the same grade, these effects are less with supplemental firing, due to a substantially lower weight ratio of air to CHF.

The high-temperature motive fluid discharged from the CHF combustor 45 flows to the gas turbine section 14 where it expands to drive compressor 13 and load 15.

A flame cooling sidestream of air from the compressor, as shown by dashed line 47 of FIG. 1, may be taken into the CHF combustor 45 for sustaining combustion with low-temperature air if necessary to prevent generation of thermally fixed $NO_x$ compounds. In such case, the CHF combustion may be essentially stoichiometric and the combustion products mix with air from heat exchanger 43 to achieve the desired gas turbine firing temperature.

The CHF combustor 45 is constructed according to principles applied in the design of combustors for gas turbines, emphasizing those principles which result in minimum production of $NO_x$ compounds. The combustor 45 is preferably of the two-stage combustion type having means for introduction of cooling air to maintain metal temperatures below values at which strength of materials becomes a problem. The combustor 45 is provided with means for premixing the fuel with a portion of the combustion air (consistent with safety considerations of flashback) and for operation of the first stage of combustion fuel-rich and the second stage fuel-lean. These features promote efficient operation with minimum production of $NO_x$ compounds.

A different embodiment of a supplementary fired combined cycle power plant is shown in FIG. 2. A gas turbine unit 50 is combined with a steam turbine 51 with both turbine portions 50 and 51 deriving heat energy from pressurized fluidized bed combustor 52. The fluidized bed combustor 52 differs from the fluidized bed combustor 12 of FIG. 1 principally in that combustor 52 operates at an elevated internal pressure. Gas turbine unit 50 comprises an air compressor section 54, a combustion gas turbine 55, a gas expander turbine 56, and is connected to drive load 57 which may be an electric generator. The steam turbine 51, including high-pressure section 59 and lower pressure sections 60 and 61, is mechanically coupled to drive electric generator 63.

The fluidized bed combustor 52, of the type disclosed in the above mentioned U.S. patent application of Willyoung, Ser. No. 063,469, which disclosure is incorporated herein by reference thereto, includes fluidized bed 64 comprising sulfur-sorbing particles 65 of, preferably, crushed limestone or dolomite. The particles 65 capture sulfur oxides formed from the combustion of coal or other sulfur-bearing carbonaceous fuel and also promote heat transfer. Combustor 52 includes a first inlet 66 for receiving a stream of pressurized air from the compressor 54, a second inlet 67 for receiving fuel, and an outlet 68 for discharging combustion gas and entrained particulate matter. Fresh sulfur-sorbing particles 65 are supplied through a third inlet 69, and spent-sorbing particles and ash solids are removed through exit port 70. Coal, supplied to the combustor 52 as fuel, is preferably in the form of small particles, and is a constituent of the fluidized bed 64.

Hot combustion gas from the fluidized bed combustor 52 passes into first stage particulate separator 72a which removes entrained particles consisting of ash, attrited sorbent particles, and unburned char and returns them to the fluidized bed 52 through return line 73. The combustion gases then pass to further particle separation as in separator 72b, where additional particulates (mostly fine ash) are removed and sent to ash disposal bin 74. The particulate stripped combustion gas then flows from the separator sections 72a and 72b to heat exchanger 75 which cools the combustion gas significantly, e.g., from about 1600° F. to about 1100° F. or less (typically 800° F.). The cooled combustion gas from heat exchanger 75 expands in combustion gas turbine 55 providing driving energy thereto. A portion of the remaining heat energy contained in the gas passing from turbine 55 is transferred in heat exchanger 76 to feedwater for steam turbine 51. The realtively low temperature of the combustion gas as it passes through turbine 55 avoids corrosion and erosion problems and minimizes the need for more extensive gas clean-up. The combustion gas from heat exchanger 76 passes to the stack 77 from which it is exhausted to the atmosphere.

A second pressurized air stream from compressor 54 is taken through heat exchanger 75 wherein heat removed from the combustion gas is transferred to the air. The second air stream then passes through an in-bed heat exchanger 79 gaining additional heat energy and raising the air temperature to approach that of the fluidized bed 64. For the reasons detailed above in describing the atmospheric fluidized bed combustor, the second pressurized air stream from in-bed heat exchanger 79 is lower in temperature than is required for highly efficient operation of gas expander turbine 56. As a remedy for the deficiency, supplemental heat is added to the second air stream by CHF combustor 80 to increase the firing temperature of gas turbine 56 and promote higher efficiency operation. The high-temperature gas stream from combustor 80 expands through the turbine 56 providing driving energy therefor. Gas exhausted from turbine 56 passes through economizer heat exchanger 81 releasing a portion of its remaining heat energy to feedwater for the steam turbine 51, and then is vented to the atmosphere through stack 77.

Among the advantages provided by the present invention over prior art combined cycle fluidized bed power plants, the following are noteworthy:

1. There is a higher overall power plant efficiency, i.e., more power produced per unit of fuel consumed.
2. The gas turbine portion of the plant operates at conventional levels of specific power and firing temperature without exposing the turbine to coal combustion products.
3. There is an ability to follow power plant load demands rapidly over a moderate range by regulating the CHF combustor. For example, 10 percent of the combined cycle plant's fuel may be CHF supplying 17 percent of the power to a load, so that a rapid turn-down from 100 percent load to 83 percent can be made.
4. As the fluidized bed combustor art advances toward higher operating temperatures the fractional portion of energy supplied by CHF may be reduced further without extensive plant changes.
5. Ability to operate the plant at a substantial fraction of its maximum rating, using coal only, in periods when CHF may be unavailable or so costly that its use is undesirable.

While there has been shown and described what is considered a preferred embodiment of the invention, it is understood that various modifications may be made therein. For example, the use of a heat recovery steam generator (HRSG) coupled with a second, bottoming steam turbine may be used in recovering waste heat from the gas turbine exhaust streams rather than recovery of such heat in feedwater heat exchangers as shown in FIGS. 1 and 2. Also it will be understood that gas turbine elements 55 and 56 in FIG. 2 may be mounted on independent shafts, each driving a section of the total plant compressor or generator load. Furthermore, it will be appreciated by those skilled in the art that a supplementary fired gas turbine cycle as described herein may be used in the cogeneration of steam to meet a heat load as well as for generating power to meet an electrical load. It is intended to claim all such modifications which fall within the true spirit and scope of the present invention.

What is claimed is:

1. An improved combined cycle steam turbine and gas turbine power plant of the type having a fluidized bed combustor for burning a carbonaceous fuel to provide heat energy for driving the turbines, the fluidized bed combustor including means for introduction and withdrawal of sulfur-sorbing particles to remove sulfur compounds formed during combustion, said improved power plant comprising:

(a) a gas turbine portion including at least one elastic-fluid driven turbine section and a compressor section for supplying a pressurized air stream;

(b) at least one heat exchanger means for transferring a portion of the heat energy provided by said fluidized bed combustor to said pressurized air stream;

(c) means for combustion of a clean hydrocarbon fuel (CHF) to provide additional heat energy, said CHF combustion means having a first inlet for receiving the pressurized air stream from said heat exchanger means, a second inlet for receiving said CHF, and an outlet fluidly connected to said turbine section for passage of a pressurized stream of gaseous combustion products and air thereto as motive fluid therefor.

2. A combined cycle power plant, comprising:
(a) a gas turbine portion including an air compressor section and a turbine section, said compressor section adapted to supply a stream of pressurized air;
(b) fluidized bed combustor for combustion of carbonaceous fuel at nearly atmospheric pressure, said combustor having a bed of fluidizable sulfur-sorbing particles and carbonaceous fuel particles, a first inlet for receiving fluidizing and combustion air at nearly atmospheric pressure from the gas turbine section, a second inlet for receiving carbonaceous fuel, a third inlet for receiving sulfur-sorbing particles, a first outlet for discharging a stream of combustion gas and particulates entrained therein, and a second outlet for discharging spent sorbing particles and ash solids;
(c) a first heat exchanger with said fluidized bed combustor for transferring heat energy to said pressurized air stream, said heat exchanger having an inlet for receiving said air stream from said compressor section and an outlet for discharging said air stream;
(d) means for combustion of a clean hydrocarbon fuel (CHF) to provide additional heat energy, said CHF combustion means having a first inlet for receiving said pressurized air stream from said first heat exchanger, a second inlet for receiving said CHF, and an outlet fluidly connected to said turbine section for passage of a pressurized stream of gaseous combustion products and air thereto as motive fluid therefor;
(e) a steam turbine; and
(f) steam generating means in said fluidized bed combustor for furnishing steam to drive said steam turbine.

3. The combined cycle power plant of claim 2 further including:
(a) means for removal of particulates from said stream of combustion gas, said removal means having an inlet for receiving said combustion gas and entrained particulates from said fluidized bed combustor, and an outlet for discharging said combustion gas; and
(b) a second heat exchanger for transferring heat energy from said combustion gas to said pressurized air stream from said compressor, said second heat exchanger having a first inlet for receiving said air stream, a second inlet for receiving said combustion gas from said particle removal means, a first outlet fluidly connected to the inlet of said first heat exchanger for discharging said air stream thereto, and a second outlet for discharging said combustion gas stream.

4. The combined cycle power plant of claim 3 further including:
(a) a first economizer heat exchanger adapted to receive said combustion gas from said second heat exchanger and transfer heat energy from said combustion gas to a feedwater stream for said steam turbine; and
(b) a second economizer heat exchanger adapted to receive a discharge gas stream from said turbine section of said gas turbine portion and transfer heat energy from said discharge gas stream to said feedwater stream.

5. The combined cycle power plant of claim 2 wherein said CHF combustor further includes means for receiving a sidestream of air from said compressor section for flame cooling to prevent formation of nitrogen oxide compounds.

6. The combined cycle power plant of claim 2 wherein the carbonaceous fuel utilized in the fluidized bed combustor is coal in particulate form.

7. The combined cycle power plant of claim 2 wherein the fluidizable sulfur-sorbing particles are selected from the group consisting of dolomite and limestone.

8. A combined cycle power plant, comprising:
(a) a gas turbine portion including a combustion gas turbine section, an expansion turbine section, and a compressor section, said compressor section adapted to supply first and second streams of pressurized air;
(b) a pressurized fluidized bed combustor for combustion of carbonaceous fuel, said combustor having a bed of fluidizable sulfur-sorbing particles and carbonaceous fuel particles, a first inlet for receiving said first stream of pressurized air, a second inlet for receiving carbonaceous fuel, a third inlet for receiving sulfur-sorbing particles, a first outlet for discharging a stream of pressurized combustion gas and particulates entrained therein, and a second outlet for discharging spent sorbing particles and ash solids;
(c) means for removal of particulates from said stream of combustion gas, said removal means having an inlet for receiving said combustion gas and entrained particulates from said fluidized bed combustor, and an outlet for discharging said combustion gas;
(d) a first heat exchanger for transferring heat energy from said combustion gas stream to said second stream of pressurized air, said heat exchanger having a first inlet for receiving said combustion gas stream from said particulate removal means, a second inlet for receiving said second stream of pressurized air from said compressor, a first outlet fluidly connected to said combustion gas turbine for discharging said combustion gas thereto as motive fluid therefor, and a second outlet for discharging said second stream of pressurized air;
(e) means for combustion of a clean hydrocarbon fuel (CHF) to provide additional heat energy, said CHF combustion means having a first inlet for receiving said second stream of pressurized air from said first heat exchanger, a second inlet for receiving said CHF, and an outlet fluidly connected to the expansion turbine section for passage of a pressurized stream of gaseous combustion products and air thereto as motive fluid therefor;
(f) a steam turbine; and
(g) steam generating means in said fluidized bed combustor for furnishing steam to drive said steam turbine.

9. The combined cycle power plant of claim 8 further including:
(a) an air heat exchanger within said fluidized bed combustor for transferring heat energy to said second stream of pressurized air, said heat exchanger having an inlet for receiving said stream of pressurized air from said first heat exchanger and an outlet fluidly connected to said CHF combustor for discharging said second stream of pressurized air thereto.

10. The combined cycle power plant of claim 9 further including:
(a) a first economizer heat exchanger adapted to receive a discharge gas stream from said combustion gas turbine and transfer heat energy from said discharge gas stream to a feedwater stream for said steam turbine; and
(b) a second economizer heat exchanger adapted to receive a discharge gas stream from said expansion turbine section and transfer heat energy from said discharge gas stream to said feedwater stream.

11. The combined cycle power plant of claim 8 wherein the carbonaceous fuel utilized in the fluidized combustor is coal in particulate form.

12. The combined cycle power plant of claim 8 wherein the fluidizable sulfur-sorbing particles are selected from the group consisting of dolomite and limestone.

* * * * *